United States Patent
Hoffman et al.

(10) Patent No.: US 10,821,813 B2
(45) Date of Patent: Nov. 3, 2020

(54) CONVERTIBLE SKELETON DOOR

(71) Applicant: Ford Global Technologies, LLC, Dearborn, MI (US)

(72) Inventors: Colleen Hoffman, Canton, MI (US); Ranil Patel, Southfield, MI (US); Timothy Bearup, South Lyon, MI (US); Stephen Thomas Kozak, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 92 days.

(21) Appl. No.: 15/880,810

(22) Filed: Jan. 26, 2018

(65) Prior Publication Data
US 2019/0232765 A1     Aug. 1, 2019

(51) Int. Cl.
*B60J 5/04* (2006.01)

(52) U.S. Cl.
CPC ........... *B60J 5/0437* (2013.01); *B60J 5/0412* (2013.01); *B60J 5/0425* (2013.01); *B60J 5/0447* (2013.01); *B60J 5/0463* (2013.01); *B60J 5/0486* (2013.01); *B60J 5/0487* (2013.01)

(58) Field of Classification Search
CPC ...... B60J 5/0437; B60J 5/0486; B60J 5/0487; B60J 5/0488
See application file for complete search history.

(56) References Cited

U.S. PATENT DOCUMENTS

| | | | | |
|---|---|---|---|---|
| 3,782,036 A | * | 1/1974 | Clark | B60J 5/0412 49/502 |
| 4,328,642 A | * | 5/1982 | Presto | B60J 5/0406 49/502 |
| 4,850,636 A | | 7/1989 | McLaren et al. | |
| 5,417,470 A | * | 5/1995 | Holt | B60J 5/0416 296/146.6 |
| 5,867,942 A | * | 2/1999 | Kowalski | B60J 5/0476 296/146.5 |
| 6,101,765 A | * | 8/2000 | Hashimoto | B60J 5/0416 296/146.5 |
| 6,343,832 B1 | * | 2/2002 | Queener | B60J 5/0425 296/146.6 |
| 6,773,054 B2 | | 8/2004 | Martini | |
| 7,338,112 B2 | | 3/2008 | Gilliland et al. | |
| 9,387,746 B2 | | 7/2016 | Rutland | |
| 2005/0110298 A1 | * | 5/2005 | Fin | B60J 5/0487 296/146.5 |
| 2018/0297455 A1 | * | 10/2018 | Hale | B60J 5/0476 |
| 2019/0061490 A1 | * | 2/2019 | Getzschman | B60J 5/0487 |

FOREIGN PATENT DOCUMENTS

| | | | |
|---|---|---|---|
| DE | 102005011808 A1 | 9/2006 | |
| EP | 0291107 A1 | 11/1988 | |
| EP | 1151880 A1 * | 11/2001 | ............ B60J 5/0411 |

* cited by examiner

*Primary Examiner* — Gregory J Strimbu
(74) *Attorney, Agent, or Firm* — David Coppiellie; Carlson, Gaskey & Olds, P.C.

(57) ABSTRACT

A vehicle door assembly includes a door housing configured for covering a vehicle access opening. An intrusion beam is within the door housing. A module is received on the intrusion beam and removable from the door housing. A module hinge assembly is attachable to the module. A module latch assembly is attachable to the module for securing the module to extend across the vehicle access opening.

5 Claims, 6 Drawing Sheets

CONVERTIBLE SKELETON DOOR

TECHNICAL FIELD

This disclosure relates to a door for a motor vehicle that includes features for converting from a conventional door to a skeleton door that provides an open air experience.

BACKGROUND

A conventional vehicle door includes a full outer skin along with window and latch hardware to completely close off a vehicle cabin from the environment. Some vehicles include tubular doors without an outer skin or other hardware to provide an open air experience. The tubular doors allow occupants to experience the outside environment from within the cabin and may provide better visibility for off road operation. The tubular doors provide a reduced structure to provide some while still providing the desired open air experience. The tubular open air doors are provided as separate optional doors that require removal and storage of the conventional door. When not in use the tubular open air doors are not typically stored within the vehicle. Storage separate from the vehicle can result in loss or damage.

SUMMARY

A vehicle door assembly according to an exemplary aspect of the present disclosure includes, among other things, a door housing configured for covering a vehicle access opening. An intrusion beam is within the door housing. A module is received on the intrusion beam and removable from the door housing. A module hinge assembly is attachable to the module. A module latch assembly is attachable to the module for securing the module to extend across the vehicle access opening.

In a further non-limiting embodiment of the vehicle door assembly, the module includes a first bracket received on the intrusion beam and door bars attached to the first bracket.

In a further non-limiting embodiment of any of the foregoing vehicle door assemblies, a second bracket is secured to the door bars apart from the first bracket.

In a further non-limiting embodiment of any of the foregoing vehicle door assemblies, the door bars include tubular structures with a first end attached to the first bracket and a second end attached to the second bracket.

In a further non-limiting embodiment of any of the foregoing vehicle door assemblies, the intrusion beam includes a channel and the first bracket includes a tab that slides within the channel to secure the module within the door housing.

In a further non-limiting embodiment of any of the foregoing vehicle door assemblies, a door glass assembly is supported within the door housing and the module is received on the intrusion beam and the module is spaced apart from the door glass assembly slide along the intrusion beam during removal from the door housing.

In a further non-limiting embodiment of any of the foregoing vehicle door assemblies, the second bracket is securable to the door housing with removable fasteners.

In a further non-limiting embodiment of any of the foregoing vehicle door assemblies, the door housing is removable from the vehicle and the module including the hinge assembly and the latch assembly are attachable to the vehicle within the access opening.

A modular vehicle door assembly according to an exemplary aspect of the present disclosure includes, among other things, a door housing including a hinge assembly movable securing the door housing across an access opening and a latch assembly securing the door in a closed position. An intrusion beam is disposed within the door housing. A module includes a first bracket removable supported on the intrusion beam, the module removable from the door housing. A module hinge assembly is attachable to the module once the module is removed from the door housing. The hinge assembly is configured to secure the module within the access opening upon removal of the door housing. A module latch assembly is attachable to the module for securing the module in a closed position.

In a further non-limiting embodiment of the modular vehicle door assembly, the module includes a first bracket received on the intrusion beam and door bars attached to the first bracket and a second bracket secured to the door bars apart from the first bracket.

In a further non-limiting embodiment of any of the foregoing modular vehicle door assemblies, the door bars include tubular structures with a first end attached to the first bracket and a second end attached to the second bracket.

In a further non-limiting embodiment of any of the foregoing modular vehicle door assemblies, the intrusion beam includes a channel and the first bracket includes a tab that slides within the channel to secure the module within the door housing.

In a further non-limiting embodiment of any of the foregoing modular vehicle door assemblies, a door glass assembly is supported within the door housing and the module is received on the intrusion beam and the module is spaced apart from the door glass assembly slide along the intrusion beam during removal from the door housing.

A method according to another exemplary aspect of the present disclosure includes, among other things, a module is configured for removal from a door housing. A module hinge is defined for assembly to the module. A module latch is defined for assembly to the module. The door housing is configured for removal from the vehicle. Features for securing the module hinge assembly to the vehicle is provided across an access opening.

In a further non-limiting embodiment of the foregoing method, removable fasteners are provided securing the module within the door housing and sliding the module out of the door housing.

In a further non-limiting embodiment of any of the foregoing methods, the door housing includes an intrusion beam and the module includes a first bracket received within a channel of the intrusion beam and the module is configured for removal by sliding the first bracket along the channel and out of an inner cavity of the door housing.

In a further non-limiting embodiment of any of the foregoing methods, the module includes a second bracket is accessible from an end of the door housing and the module is configured for removal by grasping the second bracket and sliding the module out from the door housing.

In a further non-limiting embodiment of any of the foregoing methods, the hinge assembly is configured for securement to the first bracket and the latch assembly to the second bracket.

The various features and advantages of this disclosure will become apparent to those skilled in the art from the following detailed description. The drawings that accompany the detailed description can be briefly described as follows.

DETAILED DESCRIPTION

Figure 1:
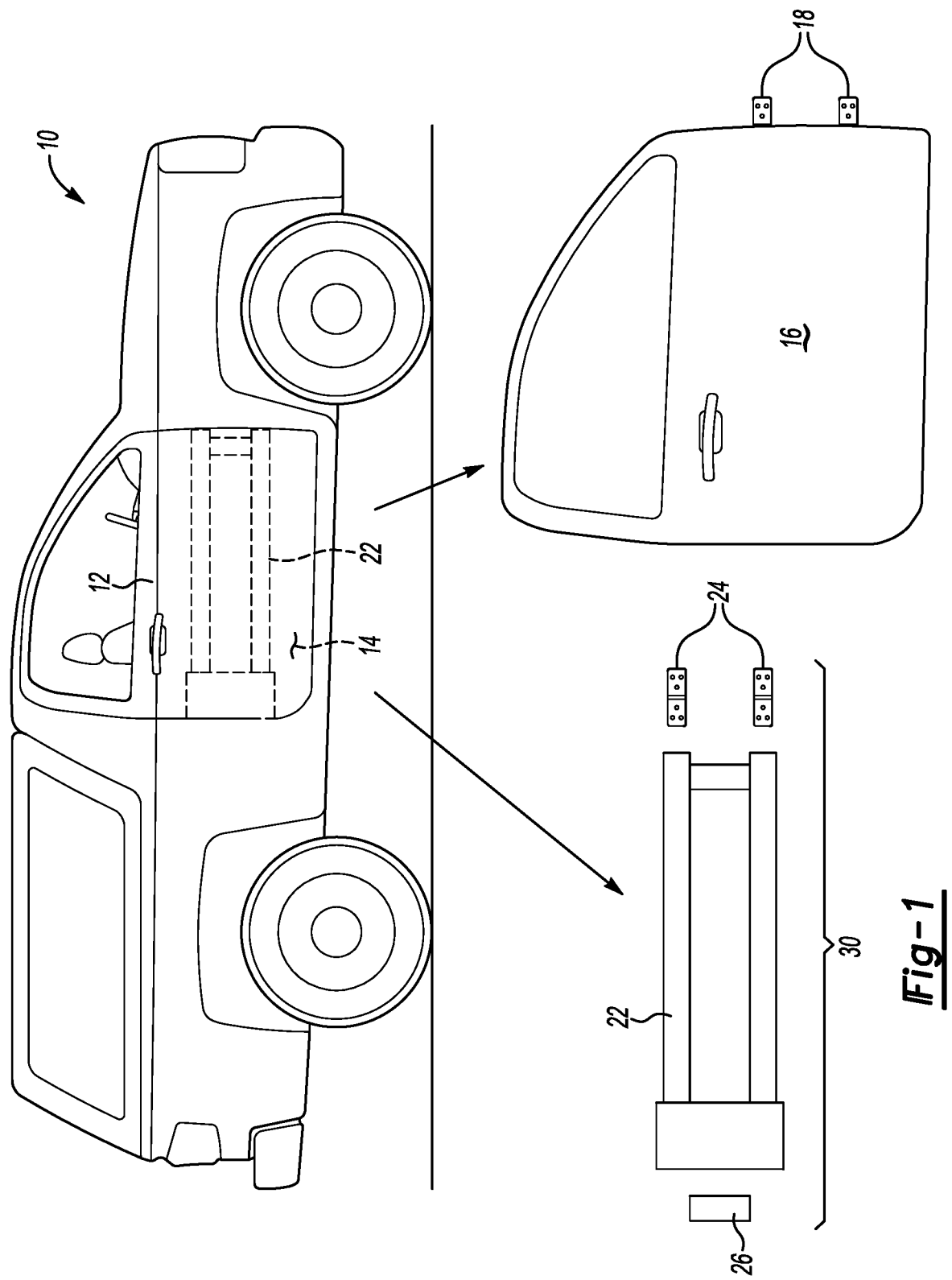
FIG. 1 is a schematic view of a vehicle including an example convertible door.

Referring to FIG. 1, a vehicle 10 includes a door 12 that is disposed within an access opening 14. The example door 12 includes an internal module 22 that is removable to provide a skeleton door assembly schematically indicated at 30. The example door 12 includes a housing 16 that is attached to the vehicle 10 by way of hinges 18. Within the housing 16 is the module 22. The module 22 is removable from the housing 16 for use as the skeleton door for the vehicle 10. The module 22 is assembled to a module latch 26 and module hinges 24 that are stored separately stored from the module 22 and the door housing 16. The module latch 26 and hinges 24 are of a size that they may be easily and conveniently stored within the vehicle 10.

Figure 2:
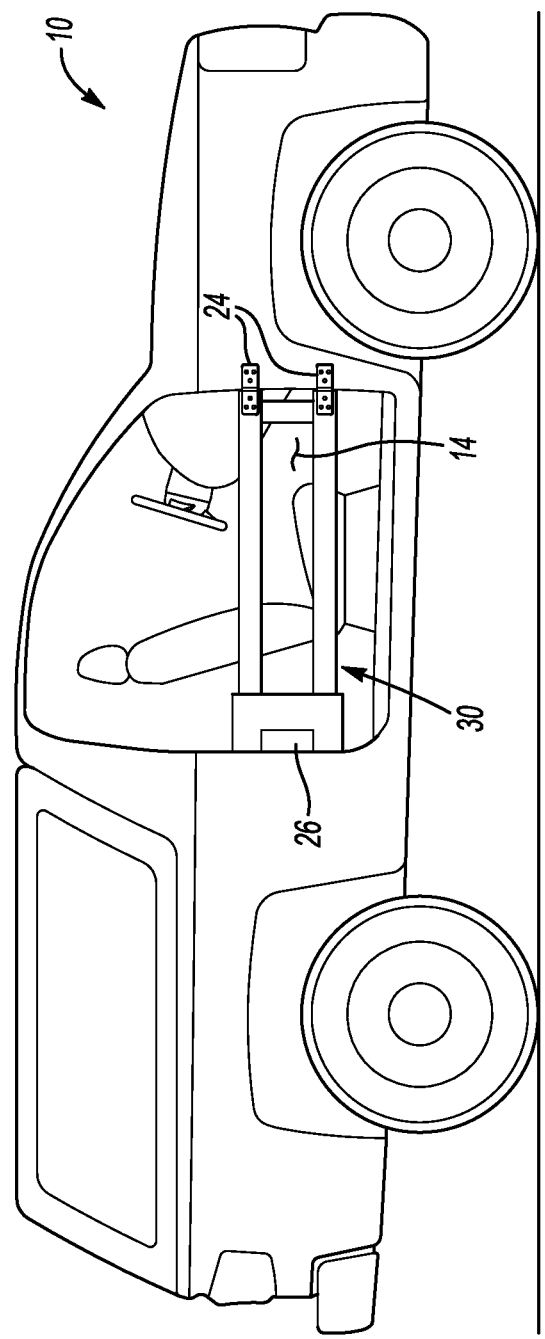
FIG. 2 is a schematic view of the vehicle including with an example skeleton door installed.

Referring to FIG. 2 with continued reference to FIG. 1, the example skeleton door assembly 30 is shown assembled to the vehicle 10. When the skeleton door assembly 30 is assembled to the vehicle 10 there is an open feeling to the vehicle cabin while still providing some protection. Moreover, the door 12 is removed from the vehicle 10 and stored to prevent damage. The reduced obstruction provided by the skeleton door assembly 30 improves visibility and the ability to experience an open air driving experience.

Figure 3:
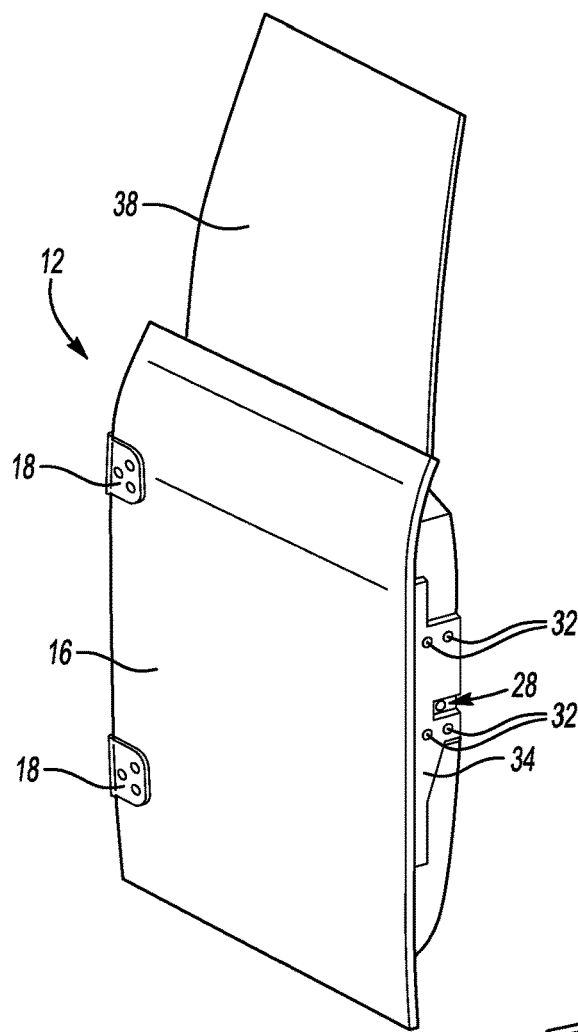
FIG. 3 is a perspective side view of a vehicle of an example convertible door embodiment.
Figure 4:
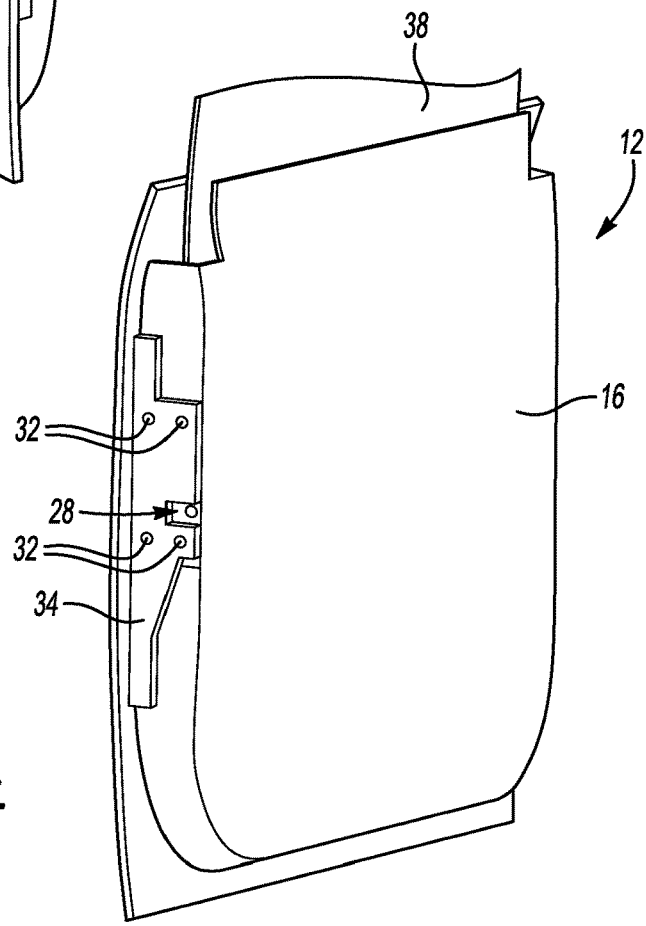
FIG. 4 is another perspective side view the example convertible door embodiment.

Referring to FIGS. 3 and 4, the example door 12 includes the hinges 18 and the door housing 16. The module 22 includes a second bracket 34 that is attached to a side 44 of the door housing 16. The second bracket 34 is attached by way of fasteners 32 to the door housing 16 and is an integral portion of the door 12 as it is being utilized for normal operation and attached to the vehicle 10. The door housing 16 includes a window 38 and accompanying structures that enable opening and closing of the window. Moreover, the door housing 16 houses a latch 28 provided to secure the door 16 to the vehicle 10 in a closed position.

Figure 5:
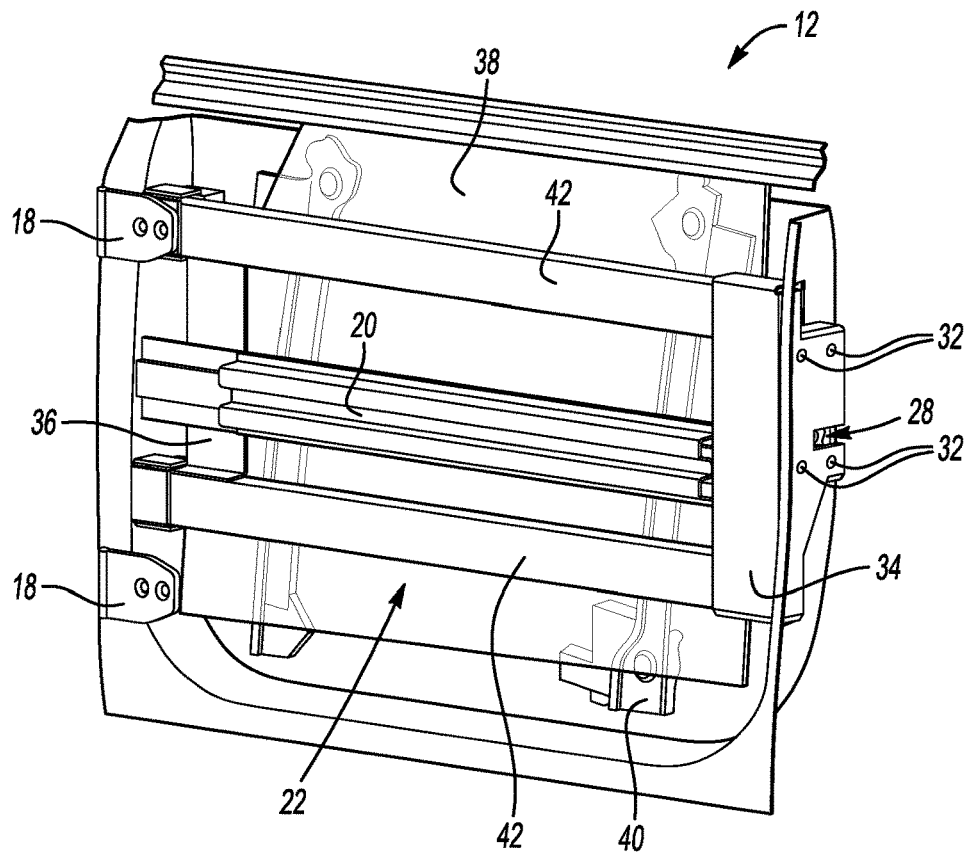
FIG. 5 is a perspective view of internal structure of the example convertible door embodiment.

Referring to FIG. 5 with continued reference to FIGS. 3 and 4, an interior of the door 12 is shown and includes an intrusion beam 20 that extends horizontally the width of the door housing 16. The intrusion beam 20 is a fixed part of the door 12 and is provided as a structure to protect against collision. The module 22 includes door bars 42 that extend between a first bracket 36 and the second bracket 34. The door bars 42 also provide some collision impact protection like the intrusion beam 20. The door bars 42 are removable with the module 22 for use as part of the skeleton door assembly.

Figure 6:
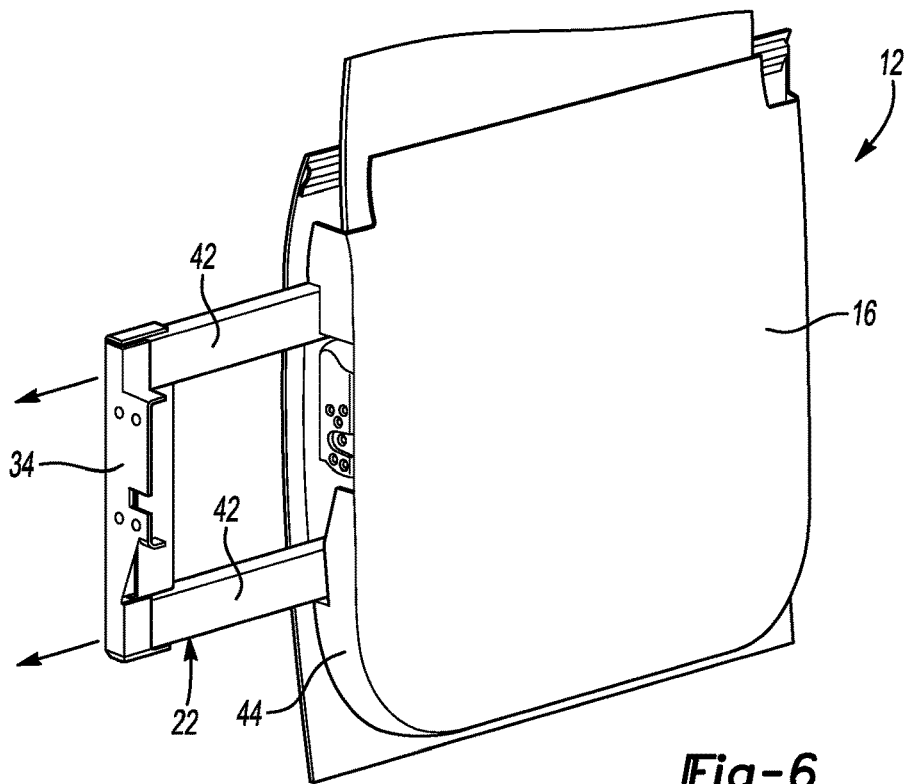
FIG. 6 is a perspective view of the vehicle door with a module partially removed.

Referring to FIG. 6 with continued reference to FIG. 5, the module 22 is slidable out of the door housing 16 such that it will not interfere and hit or slide against the window 38 or other hardware such as a window regulator that is partially shown schematically at 40 disposed within the door housing 16. To remove the module 22, the fasteners 32 are removed from the second bracket 34 disposed on the side 44 of the door housing 16. The module 22 is then free to be removed from the interior portion of the door housing 16.

Figure 7:
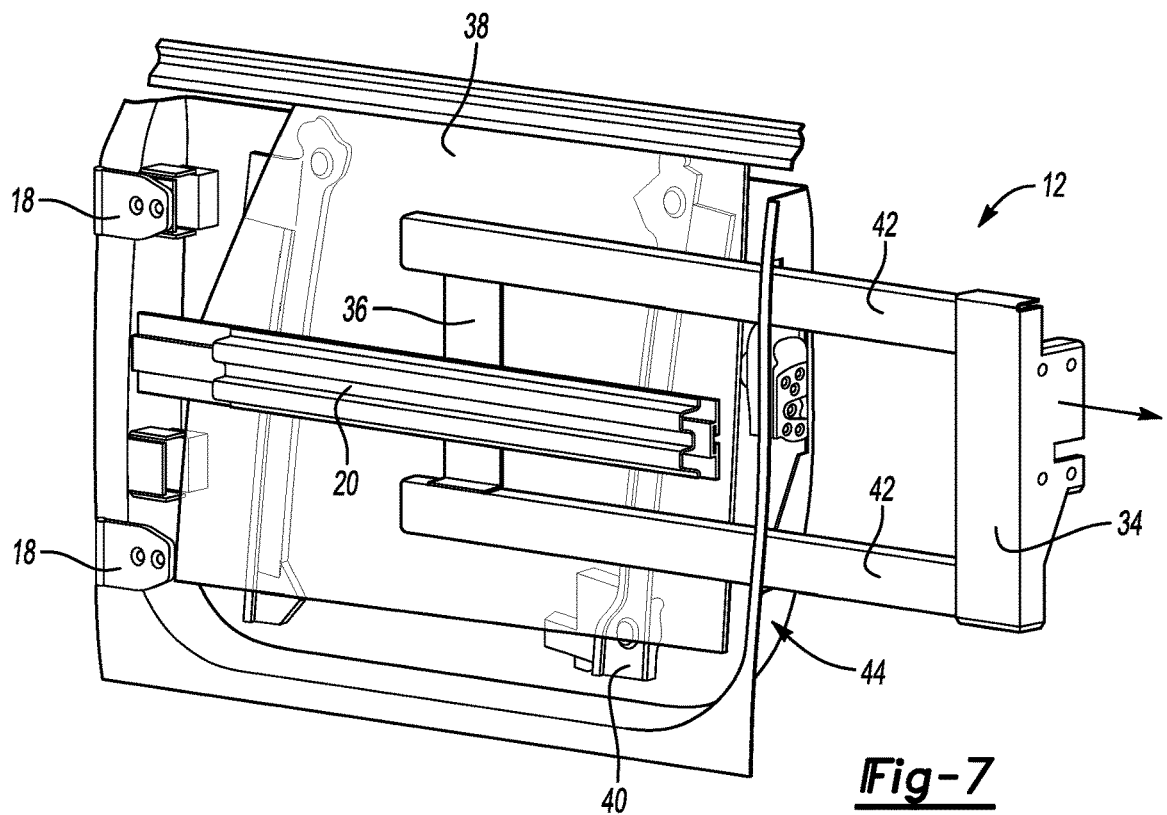
FIG. 7 is an internal view of the vehicle door with the module partially removed.

Referring to FIG. 7 with continued reference to FIG. 6, sliding removal of the module 22 occurs by grasping the second bracket 34 and pulling it away from the side 44 of the door housing 16. The first bracket 36 is engaged to an intrusion beam 20 disposed within the door housing 16. The intrusion beam 20 extends a width of the door housing 16 and guides the first bracket 36 such that the door bars 42 and other structures of the module 22 do not impinge or contact other features within the door housing 16 such as the window 38.

Figure 8:
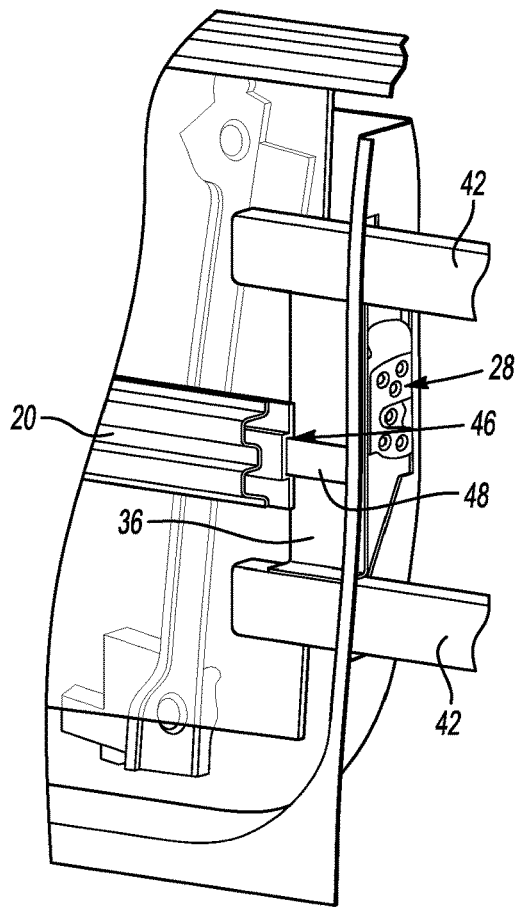
FIG. 8 is an enlarged view of a module being removed from the vehicle door.

Referring to FIG. 8 with continued reference to FIG. 7, the example intrusion beam includes a channel 46. The channel 46 is configured to receive a tab 48 defined on the first bracket 36. The tab 48 is received within the channel 46 and maintains an orientation of the module 22 including the door bars 42 as it is removed from the door housing 16. As appreciated, reinstallation of the door module 22 is conducted by inserting the tab 48 into the channel 46 of the intrusion beam 20 and then sliding the module 22 back into the door housing 16. Moreover, although the channel 46 and tab 48 may be reversed such that the tab 48 is on the intrusion beam 20 and the channel is provided on the first bracket 36. Additionally, although the first bracket 36 includes the tab 48, other structures of the module 22 could include a feature matting to the features of intrusion beam 20. Furthermore, although a channel and tab are illustrated other mating structures and shapes that provide relative alignment between relative sliding parts could also be utilized within the contemplation of this disclosure.

Figure 9:
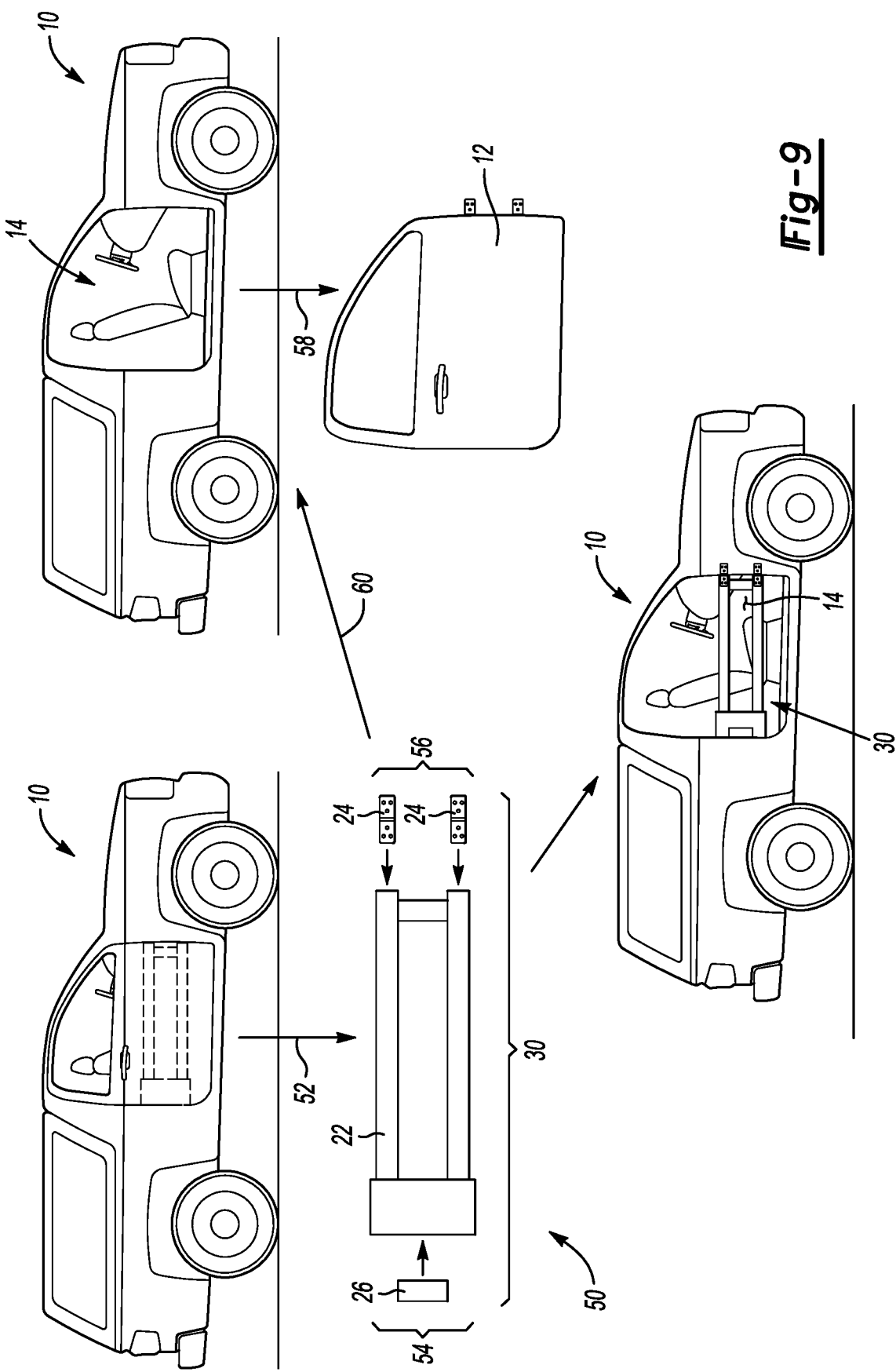
FIG. 9 is a schematic view of a method of removing, assembling and installing a skeleton door.

Referring to FIG. 9 with continued reference to FIGS. 7 and 8, a method of converting the door 12 for the vehicle 10 to a skeleton door assembly 30 is schematically shown at 50 and includes the initial step 52 of removing the module 22 from the door 12. Once the module 22 is removed from the door 12, assembly steps are undertaken to install a hinge 24 and latch 26. The hinges 24 and latches 26 can be stored within the vehicle 10 and are separately assembled to the module 22 once it is removed from the door. Attachment of the latch 26 is schematically indicated at 54 and is provided by use of threaded fasteners or other mechanical connection techniques that are known. Moreover, assembly of the hinges 24 as indicated at 56 is also provided by way of threaded fasteners or other mechanical linkage configurations and systems as are known.

The door 12 is removed from the vehicle 10 as is indicated at 58 and stored in a safe location to prevent damage. It should be appreciated that the door 12 may be removed at any time once the module 22 is removed from the door housing 16. Moreover, it is also possible to remove the module 22 from the door 12 once the door 12 is removed from the vehicle.

With the door 12 removed, the vehicle 10 includes an axis opening 14 into which the skeleton door assembly 30 is assembled as is schematically shown at 60. Assembly of the skeleton door assembly 30 includes attachment of the hinges 56 to the vehicle 10 and alignment of the latch 26 with the corresponding features on the vehicle 10.

Accordingly, once the skeleton door assembly 30 is assembled to the vehicle, the vehicle will include the door bars 22 extending across the access opening 14 to provide some protection. Moreover, the open skeleton door assembly 30 provides an open environment preferable by some operators during off-road or other desired driving conditions. The structure of the skeleton door 22 can be of any shape or size that provides the desired protection as well as a desired aesthetic appearance.

Accordingly, the example convertible door 12 includes features that are removable and usable as a skeleton door without requiring an entirely different structure. Moreover, the module 22 is removed from the door 12 and assembled to hinges 56 and latches 26 that may be carried with the vehicle. Carrying all structures for assembly of the skeleton door assembly 30 within the vehicle enables conversion from the normal door 12 at any time and also reduces the need to store separate doors.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A modular vehicle door assembly comprising:
   a door housing including a hinge assembly and a latch assembly, the latch assembly configured to selectively secure the door housing in a closed position;
   a side impact intrusion beam disposed within the door housing;
   a module including a first bracket supported directly on the intrusion beam, the module being removable from the door housing;
   a module hinge assembly attachable to the module once the module is removed from the door housing, wherein the module hinge assembly is configured to secure the module to a vehicle upon removal of the module from the door housing; and
   a module latch assembly attachable to the module for securing the module in a closed position.

2. The modular vehicle door assembly as recited in claim 1, further including a second bracket and door bars attached to the first bracket and the second bracket.

3. The modular vehicle door assembly as recited in claim 2, wherein each of the door bars comprises tubular structures with a first end attached to the first bracket and a second end attached to the second bracket.

4. The modular vehicle door assembly as recited in claim 2, wherein the intrusion beam includes a channel and the first bracket includes a tab that slides within the channel to secure the module within the door housing.

5. The modular vehicle door assembly as recited in claim 4, including a door glass assembly supported within the door housing and during removal of the module from the door housing, the module is supported on the intrusion beam and the module is spaced apart from the door glass assembly.

* * * * *